United States Patent [19]

Graham et al.

[11] Patent Number: 4,736,247
[45] Date of Patent: Apr. 5, 1988

[54] RANGE AND RANGE RATE SYSTEM

[75] Inventors: Olin L. Graham, Pearland; Jim K. Russell, Houston, both of Tex.; Walter L. Epperly, Millersville, Md.

[73] Assignee: The United States of America as represented by the Administrator of the National Aeronautics and Space Administration, Washington, D.C.

[21] Appl. No.: 45,984

[22] Filed: May 4, 1987

[51] Int. Cl.$^4$ .............................................. H04N 7/18
[52] U.S. Cl. ...................................... 358/107; 356/1; 356/4; 356/376; 364/561
[58] Field of Search ................. 358/107, 93, 903, 125; 356/1, 3, 4, 9, 15, 17, 18; 364/556, 560, 561; 354/4.3

[56] References Cited

U.S. PATENT DOCUMENTS

| | | | |
|---|---|---|---|
| 3,895,870 | 7/1975 | Cullen et al. | 356/1 |
| 4,009,960 | 3/1977 | Feldman et al. | 356/1 |
| 4,349,838 | 9/1982 | Daniel | 356/125 |
| 4,502,785 | 3/1985 | Truax | 356/376 |
| 4,627,734 | 12/1986 | Rioux | 356/1 X |

Primary Examiner—Howard W. Britton
Assistant Examiner—Victor R. Kostak
Attorney, Agent, or Firm—Hardie R. Barr; John R. Manning; Edward K. Fein

[57] ABSTRACT

A video controlled solid state range finding system includes an opto-electric camera and a helium neon laser. The laser applies coherent light to a beam splitter which applies a reference beam to the camera and an outgoing beam to a first angularly variable reflector which directs the outgoing beam to the object. An incoming beam from the object is reflected to a second angularly variable reflector and thus to the camera via the beam splitter. The first and second reflectors are configured with respect to the beam splitter so that the distance D travelled by the outgoing beam is the same as the distance travelled by the incoming beam from the second reflector to the beam splitter. The reference beam produces a reference signal and the incoming beam produces an object signal at the camera. The difference between the reference and object signals is used to vary the angle A between the outgoing beam and the reference line (31), and the angle B between the incoming beam and the reference line. The angles A and B are maintained essentially equal. The difference between the reference signal is used to provide an input to a rotator driven circuit to vary the angles of the first and second reflectors until the reference signal and object signal are coincident. Range R is then determined as $R = D \tan A$.

11 Claims, 2 Drawing Sheets

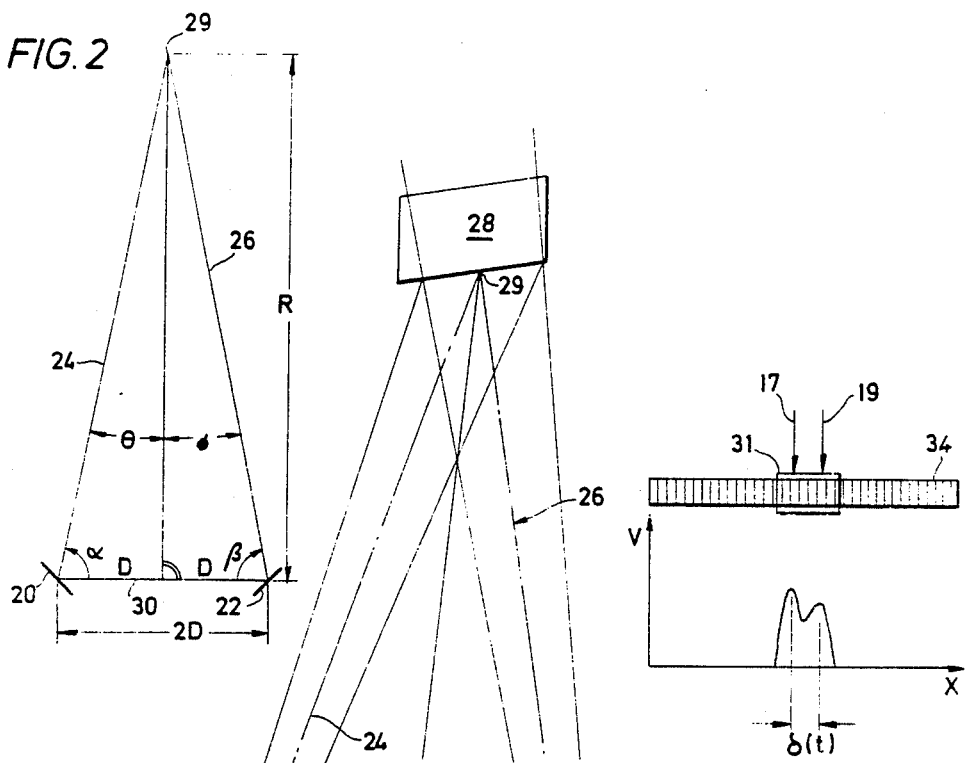
FIG. 2
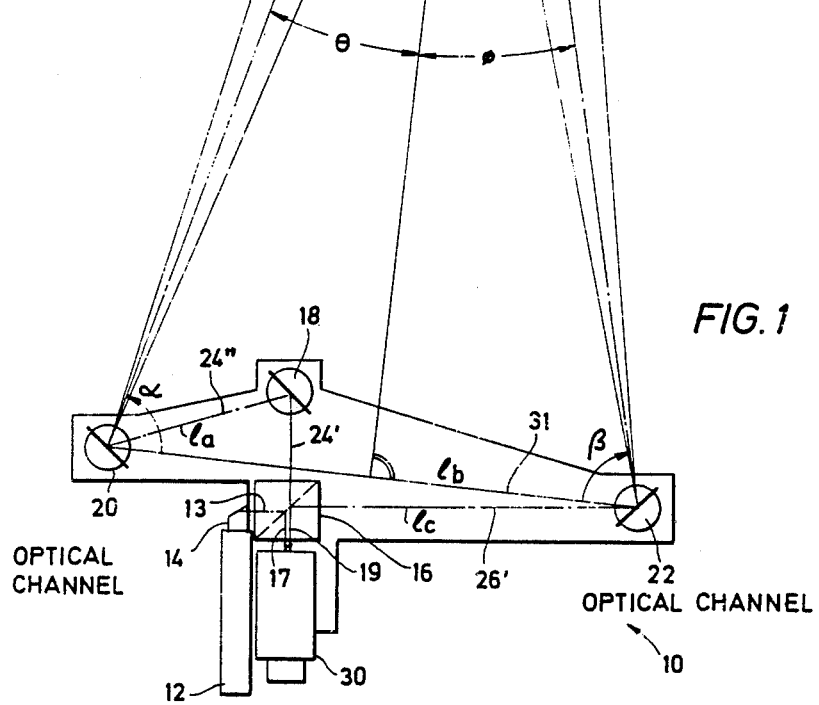
FIG. 4
FIG. 1

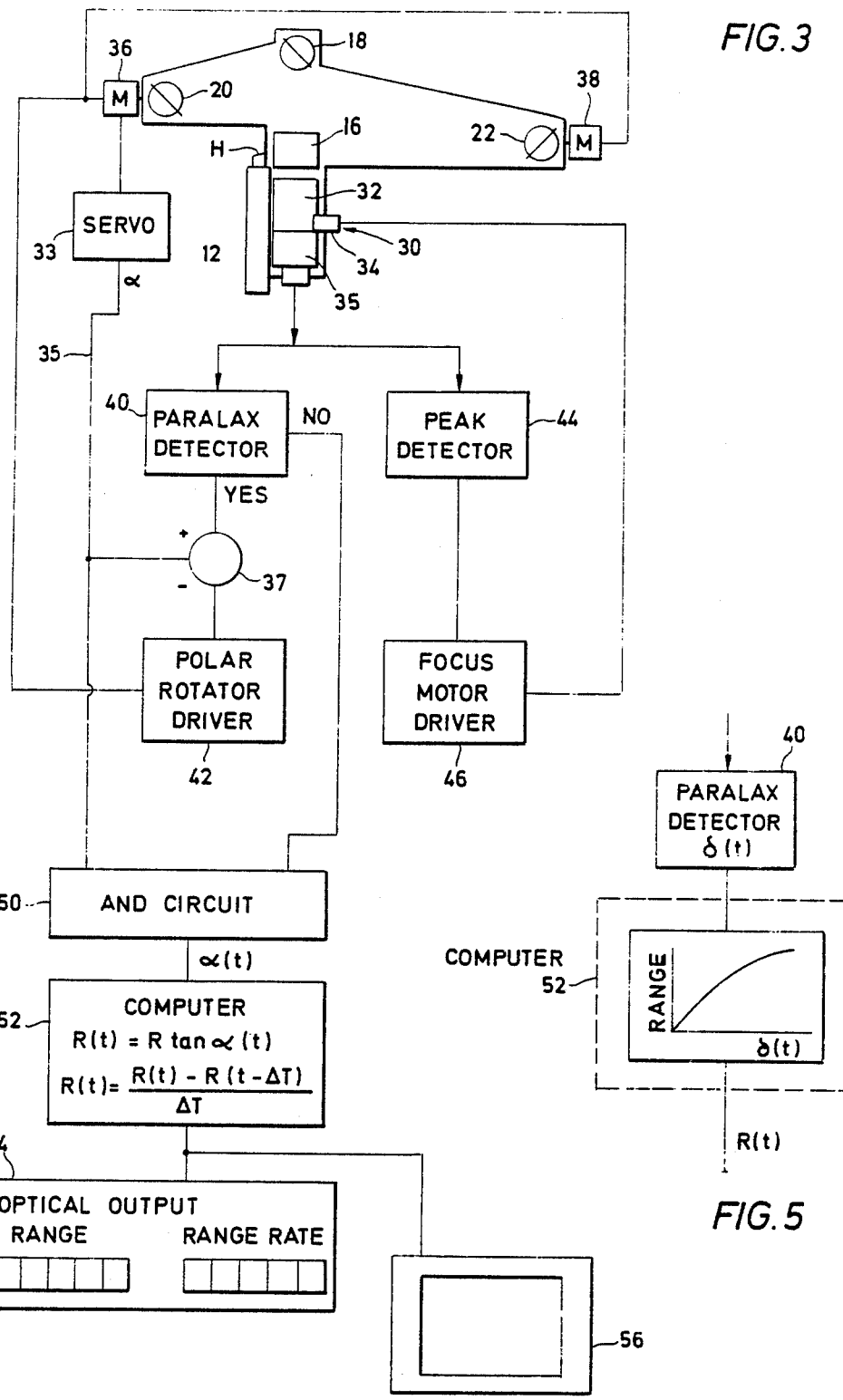

4,736,247

RANGE AND RANGE RATE SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

This invention relates in general to systems for measuring range and range rate of distant objects. In particular, the system relates to the measurement of range and range rate where the range is a relatively short distance from the measuring point to the object. Still more particularly, the invention relates to a range and range rate system for use with orbiting vehicles during docking and closing maneuvers.

2. Description of the Prior Art

Two common methods have existed for measuring range and range rate of a distant object. These two methods use radar and laser devices. Radar devices have a limited minimum range due to the relatively long time duration of transmitted pulses used to measure range.

Laser devices have required sophisticated targets on the object the distance of which is to be measured. Measuring range to vulnerable satellite targets may indicate not using radar or prior art laser devices due to the potential damaging effects of the radiation on the targets.

IDENTIFICATION OF OBJECTS OF THE INVENTION

It is therefore an object of this invention to provide a range and range rate system for relatively near objects in which no radar or high power lasers are required.

It is another object of the invention to provide a range and range rate system the effective range of which is one to two hundred feet.

It is another object of the invention to provide a range and range rate system in which no sophisticated laser target need be provided on the object to be measured.

It is another object of the invention to provide range and range rate information of the object being measured which may be viewed by the operator with a T.V. monitor or which may be graphically displayed on that monitor.

It is another object of the invention to provide a visual aid for docking of orbiting spacecraft.

SUMMARY OF THE INVENTION

The objects identified above, as well as other advantages and features of the invention are incorporated in a triangulation system for measuring range by means of an opto-electrical camera such as a lens/CCD array system. The system includes a relatively low power helium neon gas laser, beam splitter and three polar rotators. The helium neon gas laser produces a source beam of coherent light. The opto-electric camera has a photo-responsive surface for generating one or more signals indicative of the position in which one or more beams of coherent light strike its surface.

The beam splitter is stationarily disposed with respect to the camera and the laser for splitting the source beam into a reference beam and an outgoing beam. The reference beam is directed to the camera for generating a reference signal. A first angularly variable reflector redirects the outgoing beam to a point on the distant object where the outgoing beam is reflected as incoming beam. A second angularly variable reflector reflects the incoming beam to the beam splitter where it is redirected to the surface of the camera for generating an object signal.

The first reflector is placed from the beam splitter such that the outgoing beam travels a distance D between the beam splitter and the first reflector. The second reflector is placed from the beam splitter such that the incoming beam travels a like distance D between the beam splitter and the second reflector.

A servo is provided for generating an angle signal $\alpha$ proportional to the angle between the outgoing beam and a reference line between the beam reflecting points of the first and second reflectors.

In a automatic embodiment of the invention, a parallax detector is provided for determining an angle difference signal proportional to the difference signal between the reference signal and the object signal. The differential angle signal from the parallax detector is used with the angle signal from the servo of the reflector in a closed loop system for driving motors associated with the first and second reflectors until the differential angle signal is driven to zero. At that point, the angle signal $\alpha$ from the servo is applied to a computer where the range to the object is computed as $R \tan \alpha$. The range rate is also determined and both the range and range rate are displayed either on a digital output device or graphically on a T.V. screen.

In an alternative embodiment of the invention, manual means may be used to drive the reflector motors until an optical display indicates that the difference signal described above has been driven to zero.

Another alternative embodiment of the invention does not require turning the reflectors to bring the difference signal to zero but rather stores a function of range versus difference signal in memory of a computer. The difference signal then is applied to the computer for determining the range from the stored data.

According to another feature of the invention, a peak signal of the difference signal is determined for driving a lens motor for properly focusing the reference beam and the incoming beam onto the CCD array.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown of which:

FIG. 1 is a schematic diagram of the system illustrating the geometrical layout of the reflectors with respect to a helium neon laser, beam splitter and an opto-electric device or camera;

FIG. 2 illustrates the geometry of the system when the reflectors are correctly pointed toward an object and shows the relationship between range and geometrical distances and angles of the system and object;

FIG. 3 illustrates the system according to the invention including a closed loop system for detecting the difference between a reference signal and an object signal for turning the variable reflectors until the difference signal is driven to zero, whereupon a computer determines range and range rate;

FIG. 4 illustrates a CCD array and an optical window positioned about its center and shows a voltage output signal of such array; and FIG. 5 illustrates an alternative embodiment of the invention where data representing the relationship between range and the difference signal is stored in a computer and when driven by the difference signal range to the object being measured is output.

DESCRIPTION OF THE PREFERRED EMBODIMENTS

FIG. 1 illustrates the range and range rate measuring system 10 according to the invention. The system includes a helium neon laser 12 and a reflector 14 for applying a source beam 13 to beam splitter 16. The beam splitter 16 applies a reference beam 17 to an opto-electric device or camera and also applies a beam 24' to a stationary reflector 18.

Stationary reflector 18 reflects the beam 24' as a reflected beam 24" which is again reflected by the first angularly variable reflector 20 which produces an outgoing beam 24 toward object 28 at a reflecting point 29. The outgoing beam 24 is reflected as an incoming beam 26 by object 28 toward a second angularly variable reflector 22 which reflects it as indicated by beam 26' back to the beam splitter 16 where it is then applied to the camera 30 as indicated by object beam 19.

The distance travelled by beams 24' and 24" from the beam splitter 16 to the first angularly variable reflector 20 comprises the distances $l_b$ and $l_a$ the sum of which are equal to the distance $l_c$ between the second angularly variable reflector 22 and the beam splitter 16. The distance $l_c$ and the sum of $l_b$ and $l_a$ are indicated as the distance D as illustrated in FIG. 2.

When the angles $\alpha$ and $\beta$ with respect to the line 31 between the reflectors 20 and 22 are equal, the range R from the reflecting point 29 is normal to the line 31 between the reflecting points of reflectors 20 and 22. As will be shown below, when angles $\alpha$ and $\beta$ are equal, and when the object beam and the reference beam are coincident, the range R may be determined according to the relation, $R = D \tan \alpha$.

FIG. 3 illustrates the system by which the angularly variable reflectors 20 and 22 may be driven until the object beam 19 and reference beam 13 are coincident. The camera 30 includes a lens 32 and a photo-responsive CCD array 34 as indicated schematically in FIG. 3.

FIG. 4 illustrates the elements of a CCD array 34 on which an optical window 31 has been placed at its geometrical center. The reference beam 17 has been adjusted by the physical placement of the beam splitter 16 with respect to camera 30 such that reference beam 17 is positioned at the center of the CCD array. An object beam 19 is illustrated as not being coincident with the reference beam and a voltage output of the CCD array is illustrated as having peaks associated with the reference beam and the object beam.

A parallax detector 40 is provided responsive to the voltage output of the CCD array 34 as modified by the optical window 31 and detects whether or not there is a single peak in its voltage output and consequently whether or not a parallax has been detected. In other words, the detector 40 indicates whether or not the reference beam 17 and the object beam 19 are coincident.

If parallax has been detected, circuit 40 produces a differential angle signal $\Delta\alpha$, which indicates the direction by which the reflectors should be rotated in order to drive the reference beam and object beam into coincidence. A servo 33 associated with drive motor 36, for example, indicates the angular orientation of the reflector 20. The output from servo 33 on lead 35 is applied to a comparator 37 to which the $\Delta\alpha$ signal from parallax detector 40 is also applied. The output of the comparator circuit 37 then drives a polar rotator driver circuit 42 which applies a drive signal to motors 36 and 38 for changing the angular orientation of the reflectors 20 and 22. Motors 36 and 38 are stepper motor drives each having the capability of accurately varying the convergent angle $\alpha$ and $\beta$ in 0.001 degree steps. Each rotator is alternately driven such that the angle $\alpha - \beta$ is never more than 0.001 degrees.

If the parallax detector circuit 40 indicates that no parallax is detected, that is the reference beam 17 and object beam 19 are coincident, or that the voltage of the output of the CCD array shows a single spike, a signal is applied to AND circuit 50 which also has applied to it the angle $\alpha$ signal from servo 33 via lead 47.

The signal $\alpha$ is applied to computer 52 for a computational determination of range and range rate. As indicated by FIGS. 2 and 3, the range at any time T is determined from the geometrical relationship $R = \tan \alpha$. The range rate is determined by the difference between the range determined at time $= t$ and the range determined at time $= t - \Delta t$ divided by $\Delta t$. The output of the computer where range and range rate have been determined may be applied to a digital optical output display 54 where range and range rate may be digitally indicated or it may be applied to a T.V. screen 56 where range and range rate may be graphically illustrated.

FIG. 3 also shows a method by which an automatic focusing may be performed. A peak detector 44 may be used to determine the voltage peak of the reference beam. Such peak may then be applied to a focus motor driver 46 for applying a signal to lens motor 49 for maximizing the peak produced by the CCD array in response to the reference beam.

FIG. 5 shows an alternative means by which the range may be determined without the necessity for varying the reflection angles of reflectors 20 and 22. A predetermined relationship between range and the difference signal $\Delta\alpha$ may be stored in memory of computer 52. Then the output of $\Delta\alpha$ of the parallax detector is applied to the memory which produces an output of range R as a function of time.

As an alternative embodiment, the closed feedback loop between the servo 33 and the polar rotator driver 42 may be opened and a human being may assess the difference angle $\Delta\alpha$ as displayed on a T.V. screen or the like. An operator may then provide manual inputs into the polar rotator driver 42 until the difference signal $\Delta\alpha$ is driven to zero. Since the angles $\alpha$ and $\beta$ are constrained to be substantially equal to one another, the range may be determined according to the relationship or $R = D \tan \alpha$.

Various modifications and alterations in the described structures will be apparent to those skilled in the art of the foregoing description which does not depart from the spirit of the invention. For this reason, these changes are desired to be included in the appended claims. The appended claims recite the only limitation to the present invention and the descriptive manner which is employed for setting forth the embodiments

What is claimed is;

1. A system for determining the range of a distant object comprising, source means for producing a source beam of coherent light, opto-electric means having a photo-responsive surface for generating one or more signals indicative of the position at which one or more beams of coherent light strike said surface, beam splitter means stationarily disposed with respect to said opto-electric means and said source means for splitting said source beam into a reference beam and an outgoing beam, said reference beam being directed to said opto-electric means for generating a reference signal, first angularly variable reflecting means for redirecting said outgoing beam to a point on said distant object, said outgoing beam being reflected as an incoming beam from said object, second angularly variable reflecting means responsive to said incoming beam for reflecting said incoming beam to said beam splitter means, said beam splitter means directing said incoming beam to said surface of said opto-electric means for generating an object signal, said first angularly variable reflecting means being placed from said beam splitter means such that said outgoing beam travels a distance D between said beam splitter means and said first angularly variable reflecting means, said second angularly variable reflecting means being placed from said beam splitter means such that said incoming beam travels a distance D between said beam splitter means and said second angularly variable reflecting means, means for generating an angle signal $\alpha$ proportional to the angle between said outgoing beam and a reference line between beam reflecting points of said first and second reflecting means, means for maintaining said angle $\alpha$ between said outgoing beam and said reference line substantially equal to an angle $\beta$ between said incoming beam and said reference line, and computer means responsive to said angle signal $\alpha$ when said object signal and said reference signals are coincident for generating a range signal R according to the relation, $R = D \tan \alpha$.

2. The system of claim 1 further comprising,
means for detecting the difference between said reference signal and said object signal to produce a difference signal, and
means responsive to said difference signal for driving said first and second angularly variable reflecting means until said difference signal is reduced substantially to zero.

3. The system of claim 1 further comprising,
means for optically displaying said reference signal and said object signal of said opto-electric means, and
manual means for rotating said first and second angularly variable reflecting means so as to bring said object signal into coincidence with said reference signal.

4. The system of claim 1 wherein said source means is a helium neon laser.

5. The system of claim 1 wherein said opto-electric means is a CCD imaging sensor.

6. The system of claim 1 wherein said opto-electric means is a CCD imaging sensor and said means for optically displaying said reference signal is a television screen.

7. The system of claim 1 wherein said opto-electric means is a solid state television camera.

8. The system of claim 2 wherein,
said opto-electric means is a CCD imaging sensor,
said beam splitter means and said CCD imaging sensor being disposed with respect to each other to cause said reference beam to be placed at the geometric center of said imaging sensor,
said means for detecting the difference between said reference signal and said object signal includes a narrow bandpass filter disposed on the geometric center of said CCD imaging sensor for producing an error signal proportional to the direction and magnitude of the difference from said geometric center of said object signal, and
said means for driving said first and second angularly variable reflecting means includes a closed control loop with stepper motor drive means responsive to said error signal for alternately driving said first and second reflecting means so that said angles $\alpha$ and $\beta$ are never different by more than 0.001 degree.

9. The system of claim 1 further comprising,
said computer means further generating a range rate signal by determining the difference between said range signal at time t and the range signal determined at a time $\Delta T$ earlier and dividing that difference by $\Delta T$.

10. The system of claim 9 wherein said opto-electric means includes,
lens means for focusing said reference beam and said incoming beam onto said CCD imaging sensor,
said system further comprising,
means for generating a peak signal from the output of said narrow bandpass signal, and
closed control loop means responsive to said peak signal for controlling said lens means in order to automatically focus the reference beam and said incoming beam onto said CCD imaging sensor.

11. A system for determining the range of a distant object comprising,
source means for producing a source beam of coherent light,
opto-electric means having a photo-responsive surface for generating one or more signals indicative of the position at which one or more beams of coherent light strike said surface,
beam splitter means stationarily disposed with respect to said opto-electric means and said source means for splitting said source beam into a reference beam and an outgoing beam, said reference beam being directed to said opto-electric means for generating a reference signal,
first reflecting means for redirecting said outgoing beam to a point on said distant object, said outgoing beam being reflected as an incoming beam,
second reflecting means responsive to said incoming beam for reflecting said incoming beam to said beam splitter means, said beam splitter means directing said incoming beam to said surface of said opto-electric means for generating an object signal, said first reflecting means being placed from said beam splitter means such that said outgoing beam travels a distance D between said beam splitter means and said first reflecting means, said outgoing beam forming an angle $\alpha$ with respect to a reference line between beam reflecting points of said first and second reflecting means, said second reflecting means being placed from said beam splitter means such that said incoming beam travels a distance D between said beam splitter means and said second reflecting means, said incoming beam forming an angle $\alpha$ with respect to a reference line between beam reflecting points of said first and second reflecting means, means for detecting the difference between said reference signal and said object signal to produce a difference signal between said object signal and said reference signal, computer storage means for storing data corresponding to the range of said distance object as a function of said difference signal, and computer means responsive to said difference signal for accessing said computer storage means and generating a distance signal corresponding to said difference signal.

* * * * *